United States Patent
Boardman et al.

(10) Patent No.: US 9,217,373 B2
(45) Date of Patent: Dec. 22, 2015

(54) FUEL NOZZLE FOR REDUCING MODAL COUPLING OF COMBUSTION DYNAMICS

(71) Applicant: General Electric Company, Schenectady, NY (US)

(72) Inventors: Gregory Allen Boardman, Greer, SC (US); James Harold Westmoreland, III, Greer, SC (US); Sarah Lori Crothers, Greenville, SC (US); Ronald James Chila, Greenfield Center, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 443 days.

(21) Appl. No.: 13/778,222

(22) Filed: Feb. 27, 2013

(65) Prior Publication Data

US 2014/0238026 A1    Aug. 28, 2014

(51) Int. Cl.
*F02C 1/00* (2006.01)
*F02C 7/24* (2006.01)
*F23R 3/28* (2006.01)

(52) U.S. Cl.
CPC ... *F02C 7/24* (2013.01); *F23R 3/28* (2013.01); *F23R 3/286* (2013.01); *F23R 2900/00014* (2013.01)

(58) Field of Classification Search
CPC ........... F23R 3/286; F23R 2900/03043; F23R 2900/03045
See application file for complete search history.

(56) References Cited

U.S. PATENT DOCUMENTS

| | | | |
|---|---|---|---|
| 3,904,119 A * | 9/1975 | Watkins | 239/405 |
| 4,271,675 A * | 6/1981 | Jones et al. | 60/737 |
| 4,803,836 A * | 2/1989 | Blanton et al. | 60/39.464 |
| 5,129,333 A * | 7/1992 | Frederick et al. | 110/235 |
| 5,511,375 A * | 4/1996 | Joshi et al. | 60/39.463 |
| 5,822,992 A | 10/1998 | Dean | |
| 5,943,866 A * | 8/1999 | Lovett et al. | 60/737 |
| 6,959,550 B2 | 11/2005 | Freeman et al. | |
| 7,416,404 B2 * | 8/2008 | Chan | 431/183 |
| 8,001,761 B2 * | 8/2011 | Myers et al. | 60/39.281 |
| 8,037,689 B2 * | 10/2011 | Oskin et al. | 60/737 |
| 8,220,271 B2 * | 7/2012 | Poyyapakkam et al. | 60/740 |
| 2007/0193272 A1 * | 8/2007 | Hebert et al. | 60/740 |
| 2007/0263477 A1 | 11/2007 | Sudarsan et al. | |
| 2010/0223930 A1 * | 9/2010 | Chila | 60/752 |
| 2014/0060063 A1 * | 3/2014 | Boardman et al. | 60/772 |

* cited by examiner

*Primary Examiner* — Gerald L Sung
(74) *Attorney, Agent, or Firm* — Dority & Manning, PA

(57) ABSTRACT

A fuel nozzle includes a center body that extends axially along an axial centerline for a length. A shroud circumferentially surrounds the center body for at least a portion of the length of the center body. A plurality of helical passages circumferentially surround the center body along at least a portion of the length of the center body, and a fuel port in each helical passage has a different convective time.

18 Claims, 5 Drawing Sheets

FUEL NOZZLE FOR REDUCING MODAL COUPLING OF COMBUSTION DYNAMICS

FIELD OF THE INVENTION

The present invention generally involves a fuel nozzle for reducing modal coupling of combustion dynamics. In particular embodiments, the fuel nozzle and method may be incorporated into a gas turbine or other turbomachine.

BACKGROUND OF THE INVENTION

Combustors are commonly used in industrial and commercial operations to ignite fuel to produce combustion gases having a high temperature and pressure. For example, gas turbines and other turbomachines typically include one or more combustors to generate power or thrust. A typical gas turbine used to generate electrical power includes an axial compressor at the front, multiple combustors around the middle, and a turbine at the rear. Ambient air enters the compressor as a working fluid, and the compressor progressively imparts kinetic energy to the working fluid to produce a compressed working fluid at a highly energized state. The compressed working fluid exits the compressor and flows through one or more fuel nozzles in the combustors where the compressed working fluid mixes with fuel before igniting in a combustion chamber to generate combustion gases having a high temperature and pressure. The combustion gases flow to the turbine where they expand to produce work. For example, expansion of the combustion gases in the turbine may rotate a shaft connected to a generator to produce electricity.

Combustion instabilities may occur during operation when one or more acoustic modes of the gas turbine are excited by the combustion process. The excited acoustic modes may result in periodic oscillations of system parameters (e.g., velocity, temperature, pressure) and processes (e.g., reaction rate, heat transfer rate). For example, one mechanism of combustion instabilities may occur when the acoustic pressure pulsations cause a mass flow fluctuation at a fuel port which then results in a fuel-air ratio fluctuation in the flame. When the resulting fuel/air ratio fluctuation and the acoustic pressure pulsations have a certain phase behavior (e.g., approximately in-phase), a self-excited feedback loop may result. This mechanism, and the resulting magnitude of the combustion dynamics, depends at least in part on the delay between the time that the fuel is injected through the fuel nozzles and the time when the fuel reaches the combustion chamber and ignites, defined as convective time (Tau). When the convective time increases, the frequency of the combustion instabilities decreases, and when the convective time decreases, the frequency of the combustion instabilities increases.

The resulting combustion dynamics may reduce the useful life of one or more combustor and/or downstream components. Therefore, a fuel nozzle that varies the convective time would be useful to enhancing the thermodynamic efficiency of the combustors, protecting against accelerated wear, promoting flame stability, and/or reducing undesirable emissions over a wide range of operating levels.

BRIEF DESCRIPTION OF THE INVENTION

Aspects and advantages of the invention are set forth below in the following description, or may be obvious from the description, or may be learned through practice of the invention.

One embodiment of the present invention is a fuel nozzle that includes a center body that extends axially along an axial centerline for a length. A shroud circumferentially surrounds the center body for at least a portion of the length of the center body. A plurality of walls extend radially between the center body and the shroud. A plurality of helical passages at least partially defined by the center body, the shroud, and the plurality of walls, circumferentially surround the center body along at least a portion of the length of the center body. A fuel port in each helical passage has a different axial position in each helical passage.

In an alternate embodiment of the present invention, a fuel nozzle includes a center body that extends axially along an axial centerline for a length. A shroud circumferentially surrounds the center body for at least a portion of the length of the center body. A plurality of helical passages circumferentially surround the center body along at least a portion of the length of the center body, and a fuel port in each helical passage has a different convective time.

The present invention may also include a gas turbine having a compression section, a combustion section downstream from the compression section, and a turbine section downstream from the combustion section. A fuel nozzle is in the combustion section, and a plurality of helical passages extend axially in the fuel nozzle. A fuel port in each helical passage has a different convective time.

Those of ordinary skill in the art will better appreciate the features and aspects of such embodiments, and others, upon review of the specification.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which.

DETAILED DESCRIPTION OF THE INVENTION

Figure 1:
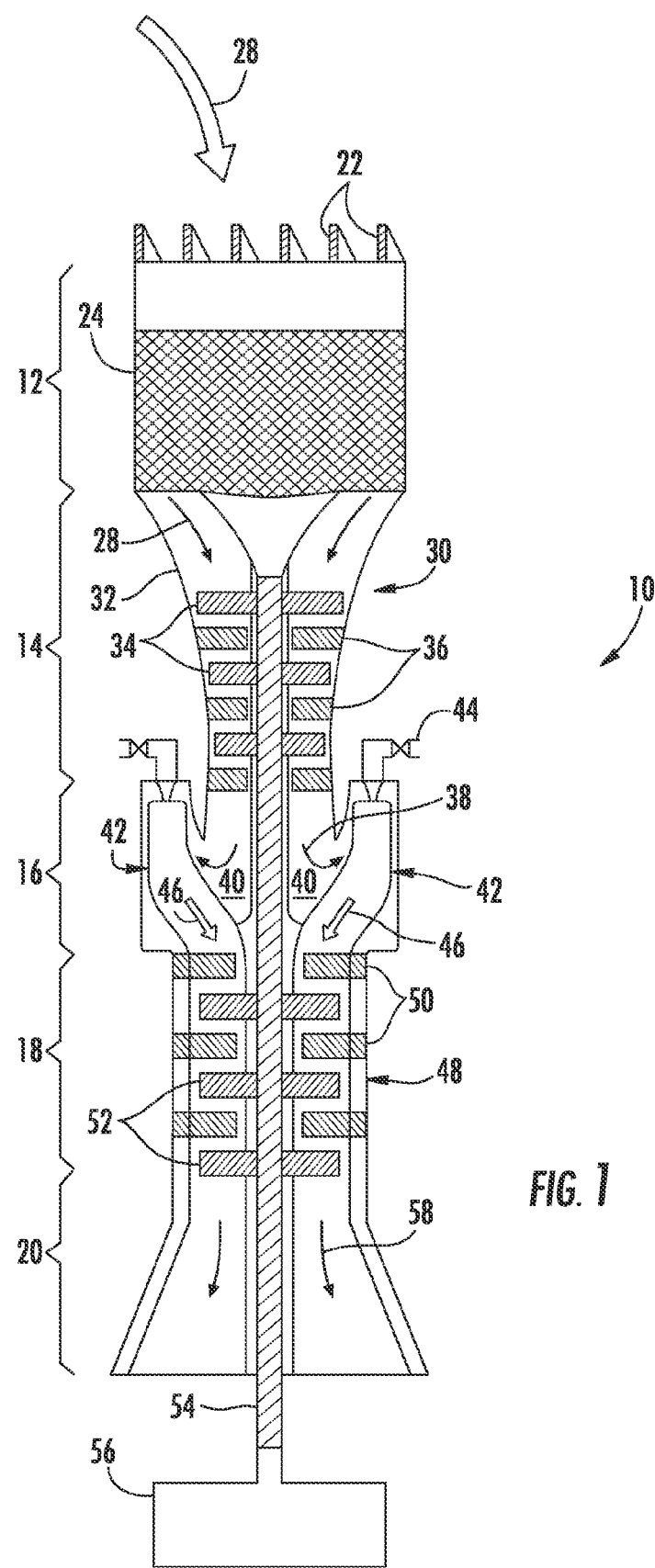
FIG. 1 is a simplified side cross-section view of an exemplary gas turbine according to various embodiments of the present invention.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first," "second," and "third" may be used interchangeably to distinguish one component from another and are not intended to signify location or importance of the individual components. The terms "upstream," "downstream," "radially," and "axially" refer to the relative direction with respect to fluid flow in a fluid pathway. For example, "upstream" refers to the direction from which the fluid flows, and "downstream" refers to the direction to which the fluid flows. Similarly, "radially" refers to the relative direction substantially perpendicular to the fluid flow, and "axially" refers to the relative direction substantially parallel to the fluid flow.

Each example is provided by way of explanation of the invention, not limitation of the invention. In fact, it will be apparent to those skilled in the art that modifications and variations can be made in the present invention without departing from the scope or spirit thereof For instance, features illustrated or described as part of one embodiment may be used on another embodiment to yield a still further embodiment. Thus, it is intended that the present invention covers such modifications and variations as come within the scope of the appended claims and their equivalents.

Various embodiments of the present invention include a fuel nozzle for reducing modal coupling of combustion dynamics. The fuel nozzle generally includes a plurality of helical passages that extend axially in the fuel nozzle, with at least one fuel port in each helical passage. In particular embodiments, the fuel nozzle may include a center body, a shroud that circumferentially surrounds at least a portion of the center body, and/or a plurality of walls that extend radially between the center body and the shroud to at least partially define the helical passages. Each fuel port may have a different axial position in the respective helical passages so that each fuel port has a different convective time. The different convective times alter the frequency and/or amplitude relationship between fuel nozzles and/or combustors to reduce the coherence of the combustion system as a whole, diminishing any coupling between fuel nozzles and/or combustors. As used herein, coherence refers to the strength of the linear relationship between two (or more) dynamic signals, which is strongly influenced by the degree of frequency overlap between them. As a result, various embodiments of the present invention may reduce the ability of the combustor tone to cause a vibratory response in downstream components. Although exemplary embodiments of the present invention will be described generally in the context of combustion dynamics in a gas turbine for purposes of illustration, one of ordinary skill in the art will readily appreciate that embodiments of the present invention may be applied to any combustion dynamics and are not limited to a gas turbine unless specifically recited in the claims.

Referring now to the drawings, wherein identical numerals indicate the same elements throughout the figures, FIG. 1 provides a simplified side cross-section view of an exemplary gas turbine 10 that may incorporate various embodiments of the present invention. As shown, the gas turbine 10 may generally include an inlet section 12, a compression section 14, a combustion section 16, a turbine section 18, and an exhaust section 20. The inlet section 12 may include a series of filters 22 and one or more fluid conditioning devices 24 to clean, heat, cool, moisturize, de-moisturize, and/or otherwise condition a working fluid (e.g., air) 28 entering the gas turbine 10. The cleaned and conditioned working fluid 28 flows to a compressor 30 in the compression section 14. A compressor casing 32 contains the working fluid 28 as alternating stages of rotating blades 34 and stationary vanes 36 progressively accelerate and redirect the working fluid 28 to produce a continuous flow of compressed working fluid 38 at a higher temperature and pressure.

The majority of the compressed working fluid 38 flows through a compressor discharge plenum 40 to one or more combustors 42 in the combustion section 16. A fuel supply 44 in fluid communication with each combustor 42 supplies a fuel to each combustor 42. Possible fuels may include, for example, blast furnace gas, coke oven gas, natural gas, methane, vaporized liquefied natural gas (LNG), hydrogen, syngas, butane, propane, olefins, diesel, petroleum distillates, and combinations thereof. The compressed working fluid 38 mixes with the fuel and ignites to generate combustion gases 46 having a high temperature and pressure.

The combustion gases 46 flow along a hot gas path through a turbine 48 in the turbine section 18 where they expand to produce work. Specifically, the combustion gases 46 may flow across alternating stages of stationary nozzles 50 and rotating buckets 52 in the turbine 48. The stationary nozzles 50 redirect the combustion gases 46 onto the next stage of rotating buckets 52, and the combustion gases 46 expand as they pass over the rotating buckets 52, causing the rotating buckets 52 to rotate. The rotating buckets 52 may connect to a shaft 54 that is coupled to the compressor 30 so that rotation of the shaft 54 drives the compressor 30 to produce the compressed working fluid 38. Alternately or in addition, the shaft 54 may connect to a generator 56 for producing electricity. Exhaust gases 58 from the turbine section 18 flow through the exhaust section 20 prior to release to the environment.

Figure 2:
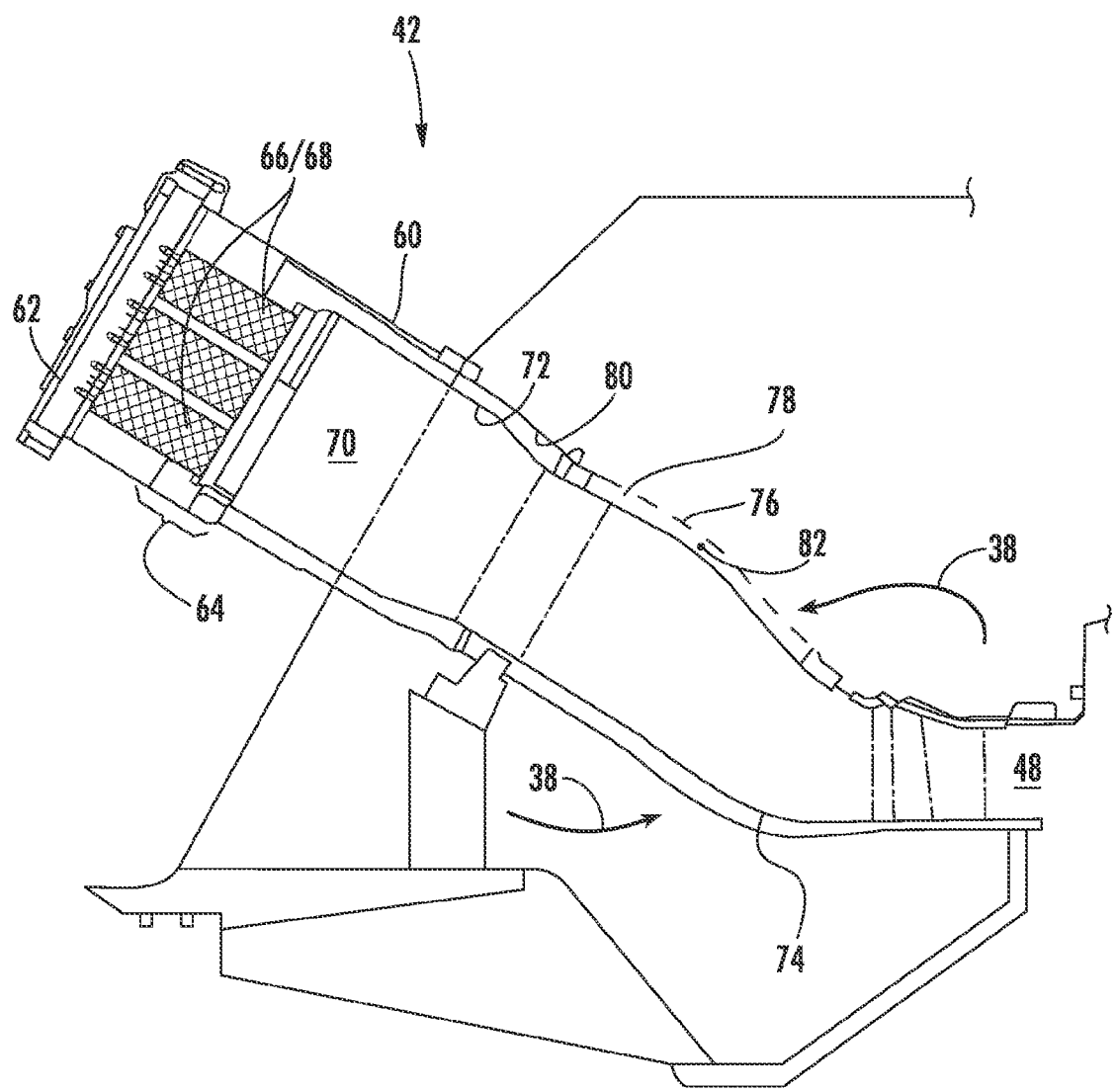
FIG. 2 is a simplified side cross-section view of an exemplary combustor according to various embodiments of the present invention.

The combustors 42 may be any type of combustor known in the art, and the present invention is not limited to any particular combustor design unless specifically recited in the claims. FIG. 2 provides a simplified side cross-section view of an exemplary combustor 42 according to various embodiments of the present invention. As shown in FIG. 2, a combustor casing 60 and an end cover 62 may combine to contain the compressed working fluid 38 flowing to the combustor 42. A cap assembly 64 may extend radially across at least a portion of the combustor 42, and one or more fuel nozzles 66 may be radially arranged across the cap assembly 64 to supply fuel to a combustion chamber 70 downstream from the cap assembly 64. A liner 72 may circumferentially surround at least a portion of the combustion chamber 70, and a transition duct 74 downstream from the liner 72 may connect the combustion chamber 70 to the inlet of the turbine 48. An impingement sleeve 76 with flow holes 78 may circumferentially surround the transition duct 74, and a flow sleeve 80 may circumferentially surround the liner 72. In this manner, the compressed working fluid 38 may pass through the flow holes 78 in the impingement sleeve 76 to flow through an annular passage 82 outside of the transition duct 74 and liner 72. When the compressed working fluid 38 reaches the end cover 62, the compressed working fluid 38 reverses direction to flow through the fuel nozzles 66 and into the combustion chamber 70.

Figure 3:
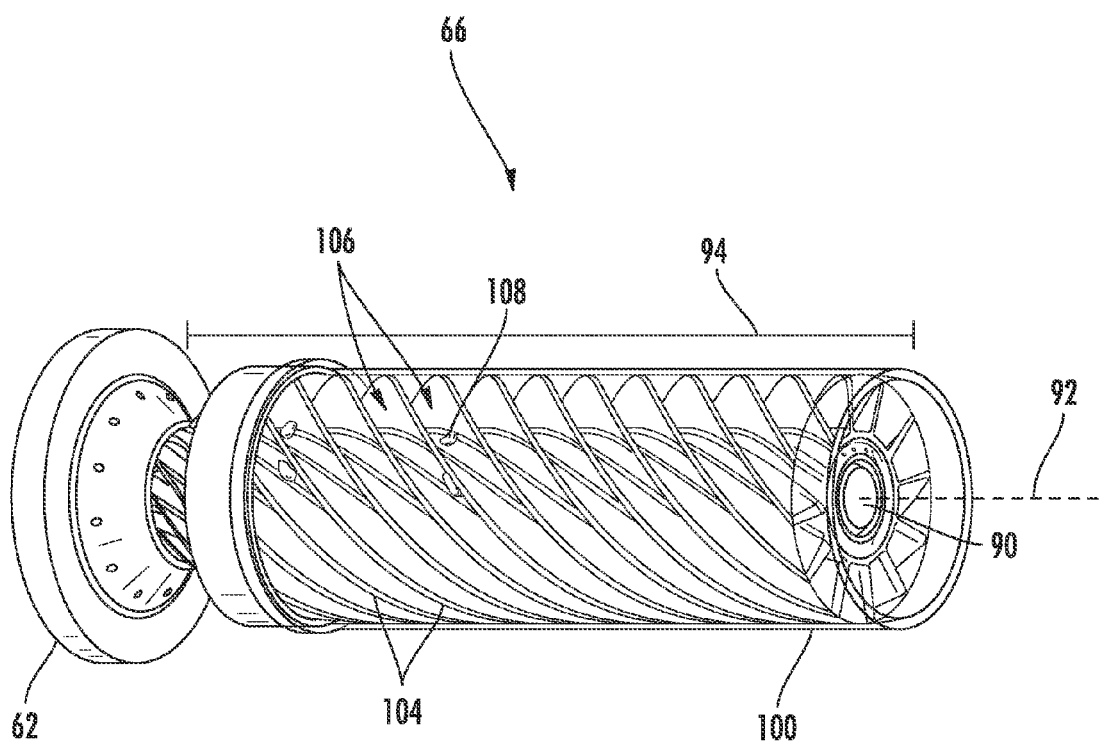
FIG. 3 is a perspective view of a fuel nozzle according to one embodiment of the present invention.
Figure 4:
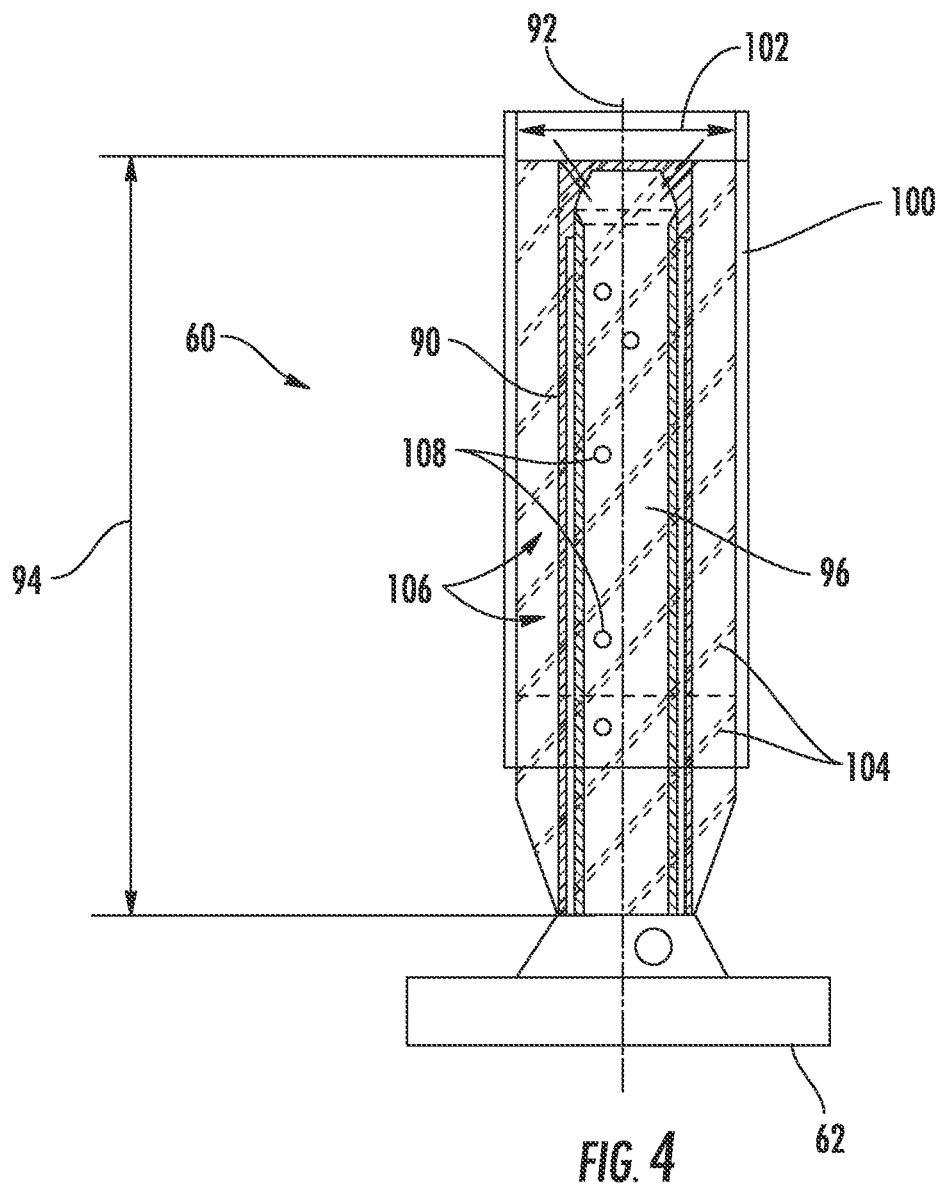
FIG. 4 is a side cross-section view of the fuel nozzle shown in FIG. 3.

FIG. 3 provides a perspective view of an exemplary fuel nozzle 66 within the scope of various embodiments of the present invention, and FIG. 4 provides a side cross-section view of the fuel nozzle 66 shown in FIG. 3. As shown in FIGS. 3 and 4, the fuel nozzle 66 may include a center body 90 that extends axially along an axial centerline 92 of the fuel nozzle 66 for a length 94. The center body 90 may connect to and/or pass through the end cover 62 to provide fluid communication from the end cover 62, through the cap assembly 64, and into the combustion chamber 70. For example, the center body 90 may include one or more fluid plenums that permit fuel, diluent, and/or other additives to flow from the end cover 62 into the combustion chamber 70. In the particular embodiment shown in FIGS. 3 and 4, a fuel plenum 96 extends axially inside the center body 90 along the length 94 to supply fuel through the fuel nozzle 66.

The fuel nozzle 66 may also include a shroud 100 that circumferentially surrounds the center body 90 for at least a portion of the length 94 of the center body 90. The shroud defines a diameter 102 inside the shroud 100. A plurality of walls 104 may extend radially between the center body 90 and the shroud 100. In this manner, the center body 90, shroud 100, and walls 104 may combine to at least partially define a plurality of helical passages 106 that circumferentially surround the center body 90 along at least a portion of the length 94 of the center body 90. The helical passages 106 impart swirl to the compressed working fluid 38 flowing through the fuel nozzle 66. In the particular embodiment shown in FIGS. 3 and 4, each wall 104 and/or helical passage 106 may extend axially upstream from the shroud 100 to receive or scoop the compressed working fluid 38 into the fuel nozzle 66. Alternately, or in addition, the shroud 100 may extend axially downstream from the walls 104 and/or helical passages 106, and the diameter 102 of the shroud 100 may decrease downstream from the walls 104 and/or helical passages 106 to enhance continued swirl of the compressed working fluid 38 flowing out of the fuel nozzle 66 and entering the combustion chamber 70.

The number and pitch angle of the walls 104 and helical passages 106 may be varied to change the overall mixing length and/or exiting swirl strength. In the particular embodiment shown in FIGS. 3 and 4, for example, the fuel nozzle 66 includes twelve walls 104 that form twelve helical passages 106 angled at approximately 50 degrees around the center body 90. In other embodiments within the scope of the present invention, the number of walls may vary between 3 and 15 or more, and the pitch angle may vary between approximately 10 degrees and 80 degrees. However, embodiments of the present invention are not limited to any particular number of walls 104 and/or helical passages 106 and/or pitch angles unless specifically recited in the claims.

As shown in FIGS. 3 and 4, each helical passage 106 includes at least one fuel port 108 to provide fluid communication from the fuel plenum 96, through the center body 90, and into each helical passage 106. The fuel ports 108 allow a fuel 109 to be injected into each helical passage 106 and swirl with the compressed working fluid 38 to enhance mixing between the fuel 109 and the compressed working fluid 38 before reaching the combustion chamber 70. The convective time (Tau) associated with each fuel port 108 is directly proportional to the distance that the fuel 109 travels before reaching the combustion chamber 70. This distance in turn is a function of the pitch angle (i.e., length) of each helical passage 106 and axial position of each fuel port 108 in the fuel nozzle 66. A shorter convective time reduces the amount of mixing between the fuel 109 and the compressed working fluid 38 flowing through the helical passages 106. A longer convective time enhances the mixing between the fuel 109 and the compressed working fluid 38, but may also increase the reactivity of the fuel 109 and create conditions conducive to premature ignition before the fuel 109 reaches the combustion chamber 70.

In the particular embodiment shown in FIGS. 3 and 4, each fuel port 108 has a different axial position in each helical passage 106, producing a corresponding different convective time for each fuel port 108. The different convective times result in a corresponding different frequency for each helical passage 108. As a result, the frequencies produced by the fuel nozzle 66 are more diffuse and have smaller amplitudes, similar to white noise, reducing the conditions conducive to combustion instabilities.

Figure 5:
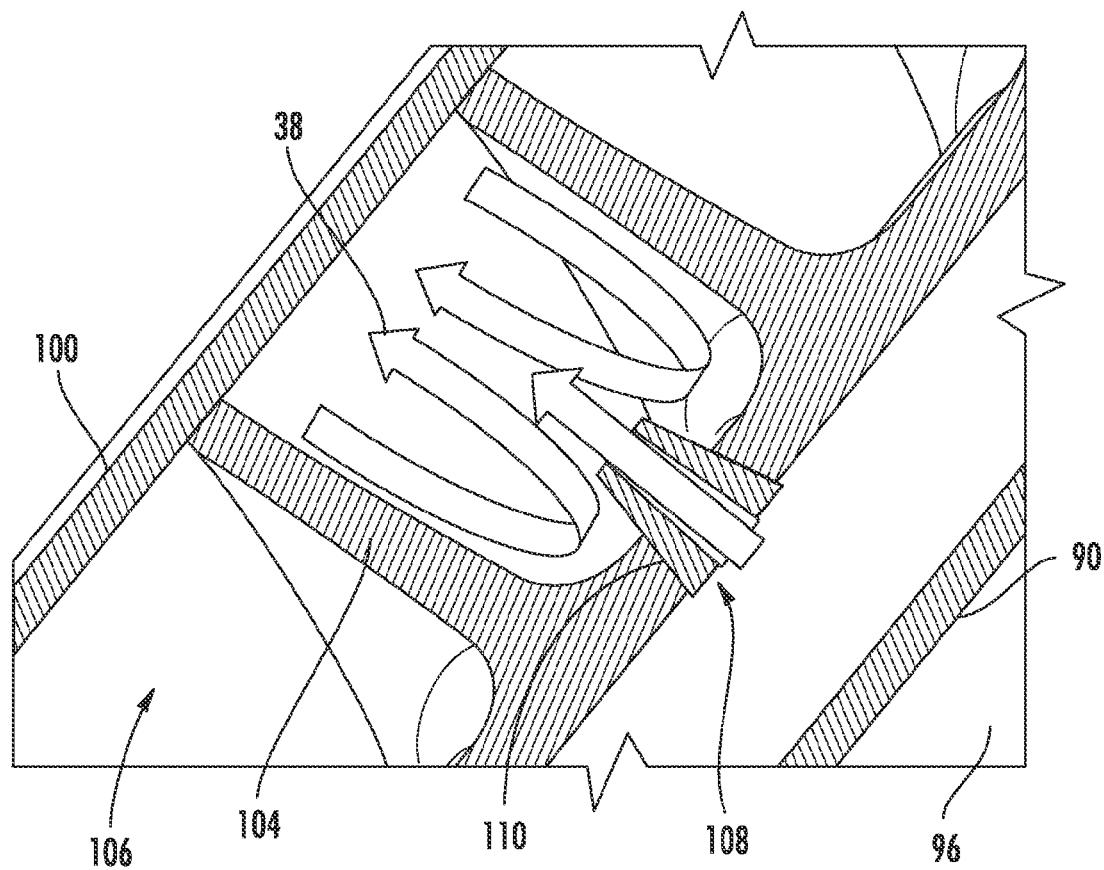
FIG. 5 is a side cross-section view of an exemplary helical passage and fuel port shown in FIGS. 3 and 4.

FIG. 5 provides a side cross-section view of an exemplary helical passage 106 and fuel port 108 shown in FIGS. 3 and 4. As shown, the fuel port 108 may be equidistant from adjacent walls 104 and may include a conical outer surface 110 that extends radially into each helical passage 106. As a result, the combination of the helical passage 106 and conical outer surface 110 may create a double vortex of compressed working fluid 38 flowing through the helical passages 106 to enhance mixing with the fuel 109 injected into the helical passage 106. In particular embodiments, the fuel ports 108 may angled in the helical passage 106 at a compound angle. Alternately, or in addition, the helical passages 106 may include turbulators to disrupt the laminar flow of the fuel 109 and compressed working fluid 38 through the fuel nozzle 66.

The various embodiments described and illustrated with respect to FIGS. 1-5 may provide one or more of the following advantages over existing combustors 42. Specifically, the more diffuse and smaller amplitude frequencies associated with the helical passages 106 reduce the conditions conducive to combustion instabilities, thereby reducing coherence and/or modal coupling of combustion dynamics. As a result, the various embodiments described herein may enhance thermodynamic efficiency, promote flame stability, and/or reduce undesirable emissions over a wide range of operating levels, without detrimentally impacting the life of the downstream hot gas path components.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A fuel nozzle, comprising:
   a. a center body that extends axially along an axial centerline for a length;
   b. a shroud that circumferentially surrounds the center body for at least a portion of the length of the center body;
   c. a plurality of walls that extend radially between the center body and the shroud, wherein the walls extend continuously about a circumference of the center body between an upstream end of the shroud and a downstream end of the center body;
   d. a plurality of helical passages at least partially defined by the center body, the shroud, and the plurality of walls, wherein each helical passage circumferentially surrounds the center body along at least a portion of the length of the center body; and
   e. a fuel port in each helical passage, wherein each fuel port has a different axial position from remaining fuel ports in remaining helical passage of the plurality of helical passages with respect to an axial centerline of the fuel nozzle.

2. The fuel nozzle as in claim 1, further comprising a fuel plenum inside the center body.

3. The fuel nozzle as in claim 1, wherein the shroud extends axially downstream from the plurality of walls.

4. The fuel nozzle as in claim 1, wherein the shroud defines a diameter, and the diameter decreases downstream from the plurality of walls.

5. The fuel nozzle as in claim 1, wherein each wall extends axially upstream from the shroud.

6. The fuel nozzle as in claim 1, wherein each fuel port provides fluid communication through the center body into a different helical passage.

7. The fuel nozzle as in claim 1, wherein each fuel port comprises a conical outer surface that extends radially into each helical passage.

8. The fuel nozzle as in claim 1, wherein each fuel port is equidistant from adjacent walls.

9. A fuel nozzle, comprising:
   a. a center body that extends axially along an axial centerline for a length;
   b. a shroud that circumferentially surrounds the center body for at least a portion of the length of the center body;
   c. a plurality of helical passages that circumferentially surround the center body along at least a portion of the length of the center body wherein the helical passages extend continuously about a circumference of the center body between an upstream end of the shroud and a downstream end of the center body; and
   d. a fuel port in each helical passage, wherein each fuel port has a different axial position from remaining fuel ports in remaining helical passages of the plurality of helical passages with respect to an axial centerline of the fuel nozzle.

10. The fuel nozzle as in claim 9, Wherein the shroud extends axially downstream from the plurality of helical passages.

11. The fuel nozzle as in claim 9, wherein the shroud defines a diameter, and the diameter decreases downstream from the plurality of helical passages.

12. The fuel nozzle as in claim 9, wherein each helical passage extends axially upstream from the shroud.

13. The fuel nozzle as in claim 9, wherein each fuel port comprises a conical outer surface that extends radially into each helical passage.

14. A gas turbine, comprising:
   a. a compression section;
   b. a combustion section downstream from the compression section;
   c. a turbine section downstream from the combustion section;
   d. a fuel nozzle in the combustion section;
   e. a plurality of helical passages that extend axially in the fuel nozzle, wherein the helical passages extend continuously about a circumference of a center body of the fuel nozzle; and
   f. a fuel port in each helical passage, wherein each fuel port has a different axial position from remaining fuel ports in remaining helical passages of the plurality of helical passages with respect to an axial centerline of the fuel nozzle.

15. The gas turbine as in claim 14, further comprising a shroud that circumferentially surrounds the plurality of helical passages, wherein the shroud extends axially downstream from the plurality of helical passages.

16. The gas turbine as in claim 14, further comprising a shroud that circumferentially surrounds the plurality of helical passages, wherein the shroud defines a diameter, and the diameter decreases downstream from the plurality of helical passages.

17. The gas turbine as in claim 14, further comprising a shroud that circumferentially surrounds the plurality of helical passages, wherein each helical passage extends axially upstream from the shroud.

18. The gas turbine as in claim 14, wherein each fuel port comprises a conical outer surface that extends radially into each helical passage.

* * * * *